(12) United States Patent
Cazard

(10) Patent No.: US 6,494,030 B2
(45) Date of Patent: Dec. 17, 2002

(54) BRACELET MADE FROM LINKS

(75) Inventor: Olivier Cazard, Maiche (FR)

(73) Assignee: Conseils et Manufactures VLG SA, Neuchatel (CH)

( * ) Notice: Subject to any disclaimer, the term of this patent is extended or adjusted under 35 U.S.C. 154(b) by 0 days.

(21) Appl. No.: 09/934,584

(22) Filed: Aug. 23, 2001

(65) Prior Publication Data

US 2002/0050133 A1 May 2, 2002

(30) Foreign Application Priority Data

Sep. 9, 2000 (EP) .............................. 00119740

(51) Int. Cl.⁷ ............................ F16G 13/08; A44C 5/00
(52) U.S. Cl. ..................... 59/80; 59/82; 59/85; 63/4
(58) Field of Search .................. 59/80, 82, 84, 59/85; 63/4

(56) References Cited

U.S. PATENT DOCUMENTS

| | | | | |
|---|---|---|---|---|
| 1,792,996 A | * | 2/1931 | Mason | 59/80 |
| 3,857,237 A | * | 12/1974 | Brauchi | 59/80 |
| 4,928,504 A | * | 5/1990 | Tuppini | 59/82 |
| 6,026,637 A | * | 2/2000 | Dombre et al. | 59/80 |
| 6,079,196 A | * | 6/2000 | Linder et al. | 59/80 |
| 6,318,064 B2 | * | 11/2001 | Vandini | 59/80 |

FOREIGN PATENT DOCUMENTS

| | | |
|---|---|---|
| CH | 262361 | 6/1949 |
| CH | 664 267 A5 | 2/1988 |
| EP | 0 738 480 A1 | 10/1996 |
| FR | 2 688 984 | 10/1993 |
| WO | 93/13686 | 7/1993 |
| WO | 94/23214 | 10/1994 |

* cited by examiner

Primary Examiner—David Jones
(74) Attorney, Agent, or Firm—Young & Thompson

(57) ABSTRACT

A bracelet made of links has two rows of side links forming the edges of the bracelet and at least one row of central links. The side links have each one two blind bores opening on the inner side directed towards the central links and the central links are traversed each one by two bores extending therethrough. Free pins are placed freely but without any looseness in the bores of the lateral links and of the central links and they have, at each one of their ends, a groove. The side links have, opening on their lower face, at least one recess giving access to the grooves of two adjoining pins. Blocking members are designed for being inserted into the recesses of the side links and they include retaining members co-operating with the grooves of the pins.

23 Claims, 3 Drawing Sheets

BRACELET MADE FROM LINKS

FIELD OF THE INVENTION

The present invention is concerned with bracelets made of links and, in particular, with watch bracelets made of steel, of a precious metal or of some other material. In such bracelets, the links are hingedly assembled and held together by means of pins, which can be either press-fitted, screwed or freely engaged. The present invention is concerned with bracelets made of links hingedly assembled and held together by means of free pins.

BACKGROUND OF THE INVENTION

Such a bracelet is known from document FR 2 688 984 which discloses a bracelet made of links assembled by means of free pins of which the ends carry grooves co-operating with housings of connecting means designed for being fastened, in the service position, into a recess provided on the outer links, which recess opens on the inner side face of these links. The fastening of these connecting means in the outer links is carried out by means of screws.

Bracelets made of links of this type have serious drawbacks associated with the fastening of the connecting means by screws into the external links.

Actually, such an assembly requires the use of a tool, such as a screwdriver for assembling and disassembling the bracelet or when adjusting the length of the bracelet. Furthermore, these bracelets exhibit some weakness when subjected to laterally applied traction forces, since all the stress is received solely by the pin, which by necessity has only a very small diameter.

Finally, the assembling and the adjusting of the length of these bracelets must be carried out by trained personnel, since the placing of the connecting means on the pins and then into the housings of the external links and their fastening by means of screws require dexterity and most often the use of special tools, for instance for forming bores.

SUMMARY OF THE INVENTION

The present invention is aimed at providing a bracelet made of links hingedly assembled and held together by means of free pins which, on the one hand, is capable of resisting particularly well to laterally applied traction forces and which, on the other hand, can be assembled, disassembled or adjusted in length by unskilled personnel, in particular by the user himself, without the need to form bores or use tools. Another aim of the invention is to make such a bracelet with a minimal number of different components, in order to reduce its cost and facilitate its manufacturing and assembling.

The object of the present invention is a bracelet which is made of links hingedly assembled and held together by means of free pins, which obviates the above-mentioned drawbacks and which achieves the aims cited above. This bracelet is characterised by the features set forth in claim 1 and includes, optionally, those set forth in the dependent claims.

BRIEF DESCRIPTION OF THE INVENTION

The appended drawing illustrates schematically and by way of example, two embodiments of the bracelet and alternate versions thereof, which bracelet is made of links in according the present invention.

DETAILED DESCRIPTION OF THE INVENTION

Figure 1:
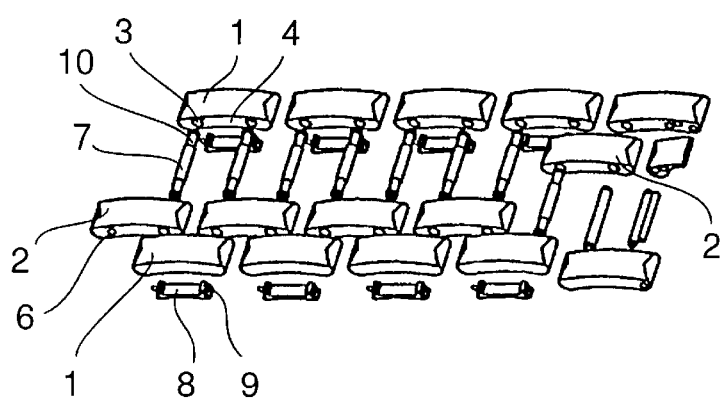
FIG. 1 is an exploded view from above of a section of a bracelet comprised of links which are simple in their shapes.
Figure 1A:
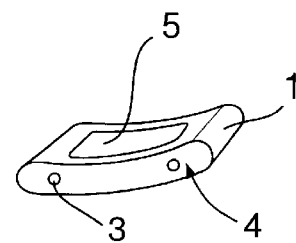

The first embodiment of the bracelet illustrated in FIG. 1 is comprised of a plurality of links which are simple in their shapes and wherein the links are arranged in several rows, generally from three to five.

The bracelet includes side links 1 forming the edges of the bracelet and central links 2 placed between the two rows of side links 1.

The side links 1 include, each one, two blind bores 3 opening on the inner side face 4 of said side link and a recess 5 opening on the lower face of said side link 1, which lower face is to come in contact with the wrist of the wearer of the bracelet.

The central links 2 are traversed transversally by two bores 6 extending therethrough.

The links 1, 2 are hingedly assembled and held together by means of free pins 7 arranged transversally with respect to the bracelet. These pins 7 have a groove 10 at each one of their ends, these grooves being located in the assembled service position in the housings 5 of the lateral links 1.

The bracelet further includes blocking members 8 with a back plate having the shape and the dimensions of the opening of the recess 5 and two elastic retaining members 9 which, in the assembled service position, come into the grooves of the pins and press elastically against the same.

Accordingly, in the assembled position of the bracelet, these blocking members 8 prevent the side links from moving laterally and they close the recesses 5. The elasticity of the retaining members 9 makes it possible to retain the blocking members 8 in their blocking position in the recesses 5 of the side links.

This assembly offers a high resistance to laterally applied traction forces to which the bracelet may be subjected, any stress generated being transmitted by the blocking elements 8 between the pins and the side links 1 through large contact areas, both on the pins and on the links.

This assembly is characterised, in particular, by the fact that the axial blocking of the pins 7 and the retaining of the blocking members 8 in the corresponding lateral links are achieved by using a single component of which the placement and the retrieval are carried out without the use of any tool or the need for any bore to be made and, furthermore, can be automated.

This assembly fulfils two functions:

1. The transversal positioning of the blocking member 8 in the side links 1. The blocking member 8 is placed in a recess 5 which opens only on the lower face of the corresponding side link. This blocking member 8 transmits any stress due to a pulling action through extensive contact and guide surfaces. If one tries to pull the side links 1 apart, the stress is transmitted from the outer faces of the grooves of the pins onto the outer faces of the blocking members and thereafter from the inner faces of the blocking members onto the inner faces of the side links. The elasticity of the blocking member plays no role in the transversal positioning. The blocking member is subjected to shearing stresses.

2. The insertion and the retaining of the blocking members in the side links. The shape of the retaining members of the blocking members which corresponds to that of the grooves of the pins is such that the retaining members are capable, owing to their elasticity, to retain the blocking members between two adjoining pins. The elasticity of the blocking member facilitates its insertion and its retention in its service position.

Furthermore, in such an assembly, the lengthwise positioning of the links with respect to one another is different from their transversal positioning. This lengthwise positioning is achieved simply by inserting the pins 7 in the corresponding bores 3, 6 of the links 1, 2 and it can therefore be made very accurate, while at the same time necessitating only simple machining operations. One can thus obtain bracelets of which the links are hingedly assembled to one another, practically without any looseness and in a manner which is simple and inexpensive.

To assemble the bracelet, firstly the side links 1 are placed on one side and the pins 7 are inserted into the blind bores 3. Then, the central links 2 are threaded over the pins 7 and, finally, the free ends of the pins 7 are inserted into the blind bores 3 of the row of side links 1 forming the other edge of the bracelet. When the side links 1 abut against the central links, the grooves 10 of the pins 7 are positioned automatically to coincide with the recesses 5 of the side links 1. Then, the blocking members 8 are force fitted into these recesses 5, which causes the elastic displacement of the retaining members 9 as they come in contact with the bottom of the grooves 10 of the pins 7. The shape of the retaining members 9 is such that once they are positioned, they retain the blocking members 8 in the assembled service position.

The assembling of the bracelet can be carried out manually without the use of a tool. The assembly obtained can be disassembled entirely at any time. To disassemble the bracelet, one only needs to remove the blocking members 8 which are held in position solely by the elasticity of the retaining members applied against the pins 7.

The bracelet described and the novel method used for its assembling offer numerous advantages.

The bracelet is made from one end to the other in the same manner, using the same components. Its design is such that it is not necessary to use special links at the ends of the bracelet for adjusting its length.

This assembling method reduces the number of components of the bracelet to a minimum and, above all, eliminates the use of the bonded screws and of the press-fitted pins of the conventional designs.

The manufacture by machining of the components of the bracelet is simple and inexpensive.

The assembling of the bracelet is easy, owing to the absence of screws and of press-fitted pins. It is identical for many models and it can readily be automated. The assembling of the bracelet is reversible and the bracelet can therefore be disassembled very easily at any time, either to adjust its length or for replacing a link which has suffered some damage.

Certain components, such as the pins and the blocking members, can be of a standard size, common to several models. They can therefore be produced in large numbers independently of the links of the bracelet.

The hinges are not visible which improves the visual appearance of the bracelet and facilitates its polishing The links can be replaced individually without the need to disassemble the whole bracelet.

The adjustment of the length of the bracelet can be carried out easily and without the use of tools. It is made simple owing to the absence of screws and of press-fitted pins. It can be carried out anywhere on the bracelet and can be made by the user.

The links are all identical and interchangeable.

In an alternate version, it is possible to make the blocking members 8 from an alloy with shape memory, such that at room temperature the blocking member 8 assumes its "normal" shape to fulfil its positioning and retaining functions as described above.

At a temperature which is different from ambient, lower or higher, the shape of the blocking member 8 changes such that it can be disengaged from the grooves 10 of the pins 7 without any tools and without the need to apply a pulling force.

The material having a shape memory can be, for example, a nickel+titanium alloy having the following characteristics:

| | |
|---|---|
| Young's modulus (GPa): | 70–90 (austenite) |
| Limit of elasticity (MPa): | 100–800 (austenite) |
| | 50–300 (martensite) |
| Temperature of transformation: | −200–120° C. |
| Bi-directional SME deformation (%) | 3,2–5 |
| Pseudo-elastic deformation (%) | 4–10 |

It is obvious that other materials with a shape memory could also be used.

The manner in which a blocking member made of a material with a shape memory functions is as follows:

At ambient temperature, for example from 0 to 50° C. the alloy is in its austenitic form and the blocking member has its normal shape.

At a temperature different from ambient temperature, for example at −40° C. the alloy is in its martensitic form. The shape of the blocking member is modified owing to a deformation associated with the <<shape memory effect>> so that it can be disengaged from the pins.

When the blocking member returns to ambient temperature (and accordingly, to the austenitic form), it resumes its <<normal>> shape.

several cycles are possible, since the bi-directional memory shape effect is acquired through a <<learning>> process.

The pseudo-elastic deformation of the nickel+titanium alloy makes it possible to place the blocking member even in it <<normal>> shape without damaging it. It is also possible to cool the same to change its shape and position it without any elastic deformation.

The property of superelasticity exhibited by the alloys with a shape memory is an additional guarantee that the blocking members 8 will remain in their service position.

Concerning the embodiment described, the retaining members 9 of the blocking members come in contact with the two surfaces of two adjoining pins 7 facing each other. In alternate versions, this could be different. In the version illustrated in FIG. 5, the blocking member 8 is formed as a short rod which is inserted into a recess 5a machined in the side link 1. The retaining members 9 abut against the surfaces of the two adjoining pins 7 which face away from each other.

Figure 6:
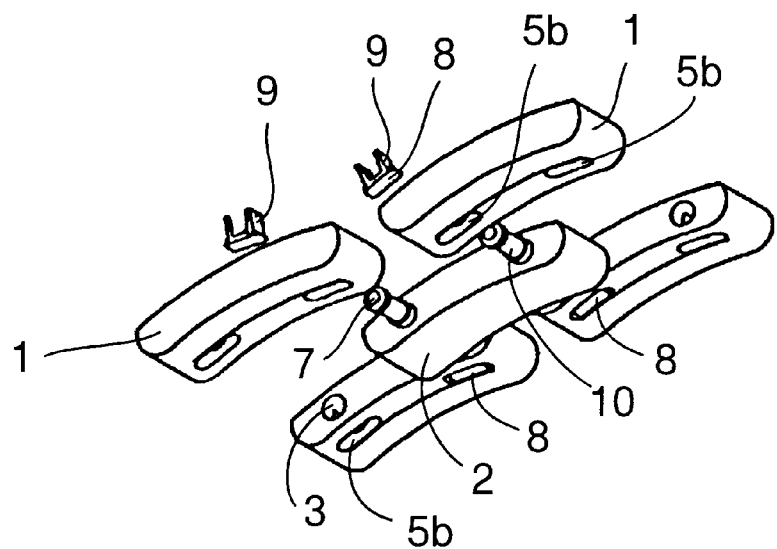
FIG. 6 illustrates a second alternate version of the blocking members.

In the version illustrated in FIG. 6, the blocking members 8 co-operate each one only with one single pin 7. In this version, each side link 1 includes two recesses 5b receiving each one a blocking member 8.

In all cases, whatever may be the shape of the blocking members 8, these members are always housed in a recess of a side link 1 and are snapped elastically on one pin 7 or on two adjoining pins 7, and these blocking members retain the links 1, 2 transversally with respect to the bracelet, on the pins 7.

Figure 2:
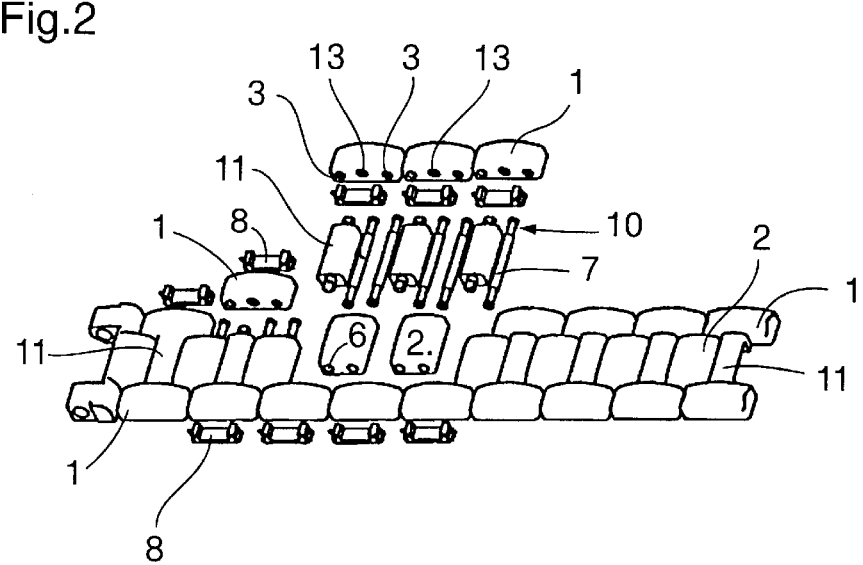
FIG. 2 is an exploded view form above of a section of a bracelet including H-shaped links.
Figure 3:
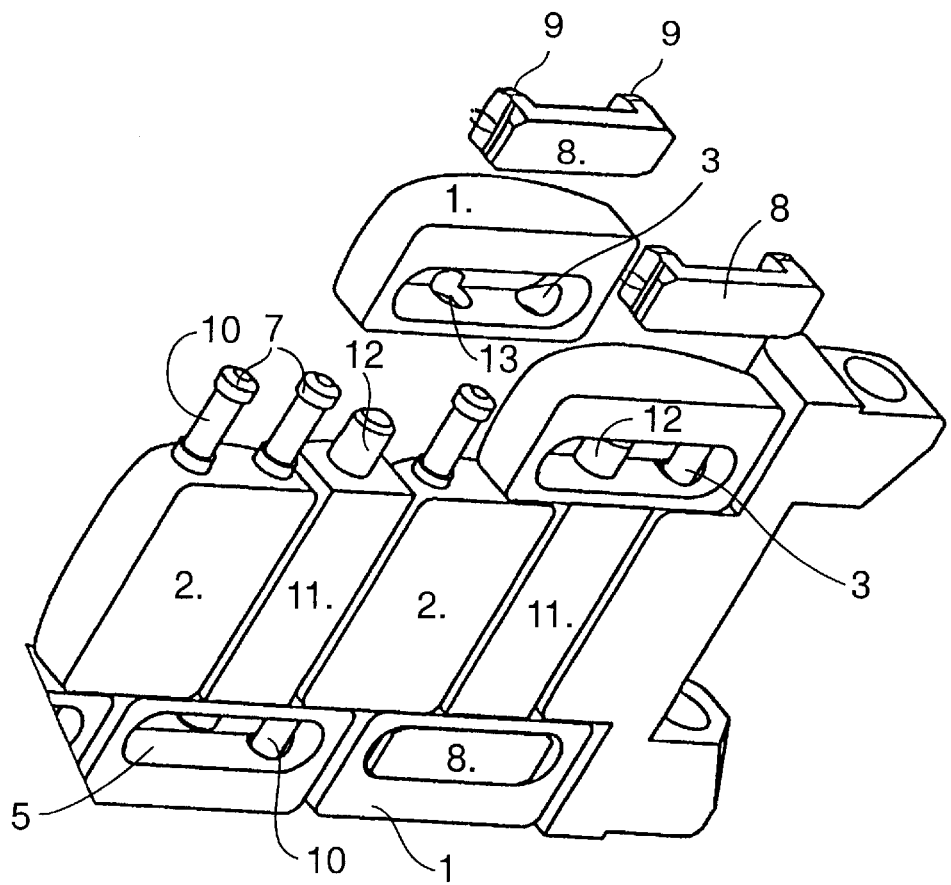
FIGS. 3 and 4 are views at an enlarged scale respectively from beneath and from above, of a detail of the section of a bracelet shown in FIG. 2 and they illustrate in detail the blocking of the pins in the outer links.
Figure 4:
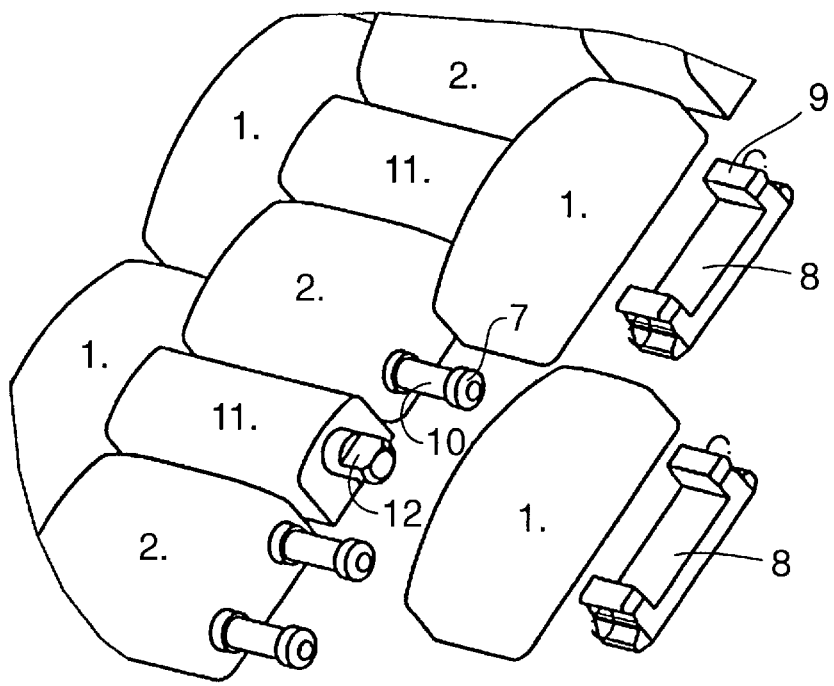

The second embodiment of the bracelet illustrated in FIGS. 2, 3 and 4 includes H-shaped links of which the side segments form side links 1 and of which the central segment forms an intermediate central link 11 which is designed for positioning between two central links 2 of a larger width.

The side links 1 and the central links 2 are assembled as was described previously by means of pins 7 having grooves 10 and of blocking members 8 designed for being inserted into the recesses 5 of the side links 1 and for co-operating elastically with the bottom of the grooves 10 of the pins 7, via the retaining members 9.

The intermediate central links 11, placed between two adjoining central links 2, have on their lateral faces protrusions 12 which, in the assembled bracelet, are inserted into the blind bores 13 provided on the side links 1, between their blind bores 3. In certain embodiments in which it is desirable that the angular position of the intermediate central links 11 (central segment of the H) be constant and fixed with respect to the side links 1, the protrusions 12 and the blind bores 13 have a shape which is not cylindrical and which prevents any relative rotation of these links 1, 11.

In this embodiment, the blocking members 8 can also co-operate with one or two pins 7, the retaining members 9 being arranged either into a groove of a pin, or snapped between two adjoining pins or around two adjoining pins, into the grooves 10 of these two pins 7.

Figure 5:
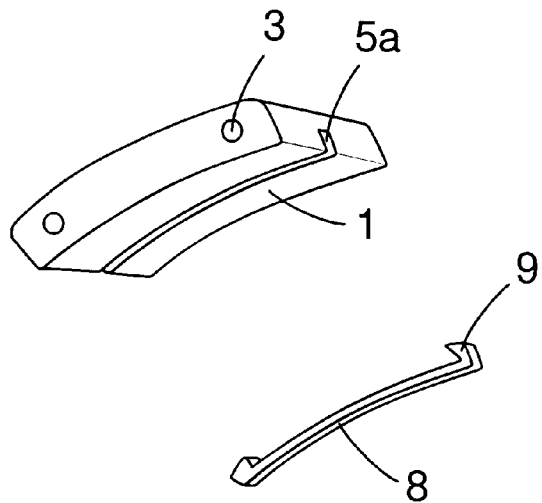
FIG. 5 illustrates a first alternate version of the blocking members.

In fact, the blocking member 8 can abut, as illustrated in FIG. 3, simultaneously against the two <<inner>> faces of two adjoining pins or it can abut, as illustrated in FIG. 5, against the two <<outer>> surfaces of two adjoining pins. In the later case, the elastic deformation of the blocking member can be increased, and the recess for receiving it can simply be a narrow groove which opens on the front faces of the side members and the blocking member, less thick, can be manufactured by cutting it out.

In the case where the blocking member is shorter and co-operates with a single pin, the side links have two recesses receiving each one such a blocking member. In this case, the blocking member can be common to a large number of bracelet models, since it does not depend any more on the distance between the axes of the pins, but only on the diameter of these pins.

Quite obviously, these blocking members can also be made of an alloy having a shape memory, as was described previously.

The ends of the bracelet described can either be affixed directly to a clasp or a watch case for example, or they can be fixed to these components via a connector component or link of an appropriate shape.

It can hence be seen that this new bracelet is made of a plurality of links assembled hingedly and held together via free pins. These free pins have two grooves, one at each end, which make it possible to hold the links transversally in their position by means of blocking members housed in the side links. These blocking members are readily placed and removed manually without any tool and they can be accessed to from the lower face of the side links. This new design simplifies the manufacture of the bracelet by eliminating any precisely performed threading and boring operations, as well as its assembling, by eliminating the screws and their bonding, as well as the press-fitting of the pins. Accordingly, the assembling can be automated and the manufacturing controls can be simplified. The after-sales service is also greatly simplified, since the assembling and the dismounting, as well as the replacement of any link of the bracelet, are carried out without the use of tools and each link can be replaced separately.

What is claimed is:

1. A bracelet made of links, comprising:
    two rows of side links forming edges of the bracelet;
    at least one row of central links arranged between said side links;
    each side link having an inner side directed towards the central links, and a lower face;
    two blind bores opening on the inner side of each side link;
    each central link being traversed by two bores extending therethrough;
    free pins placed in the bores of the side links, and of the central links;
    said pins having two ends, and a groove at each end;
    at least one recess opening on the lower face of each side link; said recess being wholly located within an interior of said lower face;
    said recess providing access to the grooves of two adjoining pins;
    blocking members structured and arranged to be inserted into the recesses of the side links, and to leave exposed a peripheral surface of the lower face; and
    said blocking members having retaining members cooperating with the grooves of the pins.

2. The bracelet according to claim 1, wherein each side link has one single recess providing access to the grooves of two adjoining pins; each groove having a bottom, and the retaining members of a blocking member cooperating with outer faces of the bottoms of the grooves of the two adjoining pins when said blocking members is inserted into the recess of the side link.

3. The bracelet according to claim 1, wherein each side link has one single recess providing access to the grooves of two adjoining pins; each groove having a bottom, and the retaining members of a blocking member cooperating with inner faces of the bottoms of the grooves of two adjoining pins when said blocking member is inserted into the recess of the side link.

4. The bracelet according to claim 1, wherein in a service position, each blocking member is snapped on one pin or between two adjoining pins.

5. The bracelet according to claim 1, wherein each side link is provided with two recesses, each recess providing access to a groove of one of two adjoining pins, and each recess receiving a blocking member whose retaining members cooperate with the groove of a pin.

6. The bracelet according to claim 5, wherein in a service position, each blocking member is snapped into the groove of a pin.

7. The bracelet according to claim 5, wherein the snapping of the blocking members is achieved through their elastic deformation.

8. The bracelet according to claim 4, wherein the blocking members are made of an alloy with a shape memory such that at room temperature, the blocking members assume a normal shape to fulfill positioning and retaining functions, and at a different temperature the blocking members change such that they can be disengaged from the recesses.

9. The bracelet according to claim 1 further comprising intermediate central links, each intermediate central link being placed between two adjoining central links; and said intermediate central links being mounted between two opposite side links.

10. The bracelet according to claim 9, wherein the intermediate central links have side faces and include protrusions extending from said side faces; said protrusions being housed, in a service position, in housings provided on the side links between the blind bores.

11. The bracelet according to claim 10, wherein the protrusions and the corresponding housings have a non-cylindrical shape which prevents any relative angular motion between the side links and the corresponding intermediate central links.

12. A bracelet made of links, comprising:
two rows of side links forming edges of the bracelet;
at least one row of central links arranged between said side links;
each side link having an inner side directed towards the central links, and a lower face;
two blind bores opening on the inner side of each side link;
each central link being traversed by two bores extending therethrough;
free pins placed in the bores of the side links, and of the central links;
said pins having two ends, and a groove at each end;
at least one recess opening on the lower face of each side link;
said recess providing access to the grooves of two adjoining pins;
blocking members structured and arranged to be inserted into the recesses of the side links;
said blocking members having retaining members cooperating with the grooves of the pins; and
wherein each side link is provided with two recesses, each recess providing access to a groove of one of two adjoining pins, and each recess receiving a blocking member whose retaining members cooperate with the groove of a pin.

13. The bracelet according to claim 12, wherein in a service position, each blocking member is snapped into the groove of a pin.

14. The bracelet according to claim 12, further comprising intermediate central links, each intermediate central link being placed between two adjoining central links; and said intermediate central links being mounted between two opposite side links.

15. The bracelet according to claim 14, wherein the intermediate central links have side faces and include protrusions extending from said side faces; said protrusions being housed, in a service position, in housings provided on the side links between the blind bores.

16. The bracelet according to claim 15, wherein the protrusions and the corresponding housings have a non-cylindrical shape which prevents any relative angular motion between the side links and the corresponding intermediate central links.

17. A bracelet made of links, comprising:
two rows of side links forming edges of the bracelet;
at least one row of central links arranged between said side links;
each side link having an inner side directed towards the central links, and a lower face;
two blind bores opening on the inner side of each side link;
each central link being traversed by two bores extending therethrough;
free pins placed in the bores of the side links, and of the central links;
said pins having two ends, and a groove at each end;
at least one recess opening on the lower face of each side link;
said recess providing access to the grooves of two adjoining pins;
blocking members structured and arranged to be inserted into the recesses of the side links;
said blocking members having retaining members cooperating with the grooves of the pins; and
wherein the blocking members are made of an alloy with a shape memory such that at room temperature, the blocking members assume a normal shape to fulfill positioning and retaining functions, and at a different temperature the blocking members change such that they can be disengaged from the recesses.

18. The bracelet according to claim 17, wherein each side link has one single recess providing access to the grooves of two adjoining pins; each groove having a bottom, and the retaining members of a blocking member cooperating with outer faces of the bottoms of the grooves of the two adjoining pins when said blocking members is inserted into the recess of the side link.

19. The bracelet according to claim 17, wherein each side link has one single recess providing access to the grooves of two adjoining pins; each groove having a bottom, and the retaining members of a blocking member cooperating with inner faces of the bottoms of the grooves of two adjoining pins when said blocking member is inserted into the recess of the side link.

20. The bracelet according to claim 17, wherein the snapping of the blocking members is achieved through their elastic deformation.

21. The bracelet according to claim 17, further comprising intermediate central links, each intermediate central link being placed between two adjoining central links; and said intermediate central links being mounted between two opposite side links.

22. The bracelet according to claim 21, wherein the intermediate central links have side faces and include protrusions extending from said side faces; said protrusions being housed, in a service position, in housings provided on the side links between the blind bores.

23. The bracelet according to claim 22, wherein the protrusions and the corresponding housings have a non-cylindrical shape which prevents any relative angular motion between the side links and the corresponding intermediate central links.

* * * * *